United States Patent
Pfau

(10) Patent No.: US 11,338,802 B2
(45) Date of Patent: May 24, 2022

(54) CONTROL SYSTEM AND CONTROL METHOD FOR CONTROLLING BEHAVIOR OF MOTORCYCLE

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 16/770,297

(22) PCT Filed: Dec. 4, 2018

(86) PCT No.: PCT/IB2018/059599
§ 371 (c)(1),
(2) Date: Jun. 5, 2020

(87) PCT Pub. No.: WO2019/111138
PCT Pub. Date: Jun. 13, 2019

(65) Prior Publication Data
US 2021/0171026 A1    Jun. 10, 2021

(30) Foreign Application Priority Data

Dec. 6, 2017 (JP) .............................. JP2017-234053

(51) Int. Cl.
*B60W 30/095* (2012.01)
*G08G 1/16* (2006.01)

(52) U.S. Cl.
CPC ...... *B60W 30/0956* (2013.01); *B60W 30/095* (2013.01); *G08G 1/163* (2013.01);
(Continued)

(58) Field of Classification Search
CPC ......... B60W 30/0956; B60W 2300/36; B60W 2420/42; B60W 2520/10; B60W 2552/53;
(Continued)

(56) References Cited

U.S. PATENT DOCUMENTS

2012/0310466 A1    12/2012    Dolgov et al.
2013/0338868 A1    12/2013    Essame et al.
(Continued)

FOREIGN PATENT DOCUMENTS

EP          2405416        1/2012
JP        2009116882       5/2009
(Continued)

OTHER PUBLICATIONS

International Search Report for Application No. PCT/IB2018/059599 dated Mar. 21, 2019 (English Translation, 3 pages).
(Continued)

*Primary Examiner* — Jason Holloway
(74) *Attorney, Agent, or Firm* — Michael Best & Friedrich LLP

(57) ABSTRACT

The present invention provides a control system and a control method capable of appropriately supporting driving of a motorcycle by a rider.
The control system includes an execution unit that causes the motorcycle to execute an automatic decelerating operation in a case where an obstacle is located in a predetermined range where a collision avoiding operation of the motorcycle is required, a lane position information acquiring unit that acquires relative position information of a lane boundary with respect to the motorcycle during traveling, and a detection angle range setting unit that set a detection angle range of a forward environment detecting device to be wide in a case where a determination reference is satisfied, in which the determination reference includes a condition that the lane position information acquired by the lane position information acquiring unit satisfies a prescribed condition.

12 Claims, 5 Drawing Sheets

(52) U.S. Cl.
CPC ............. *G08G 1/166* (2013.01); *G08G 1/167* (2013.01); *B60W 2300/36* (2013.01); *B60W 2420/42* (2013.01); *B60W 2520/10* (2013.01); *B60W 2552/53* (2020.02); *B60W 2554/80* (2020.02); *B60W 2720/106* (2013.01)

(58) Field of Classification Search
CPC ....... B60W 2554/80; B60W 2720/106; B60W 30/095; G08G 1/163; G08G 1/166; G08G 1/167
See application file for complete search history.

(56) References Cited

U.S. PATENT DOCUMENTS

| | | | |
|---|---|---|---|
| 2015/0151725 A1* | 6/2015 | Clarke ................. | B60W 10/18 701/28 |
| 2017/0144665 A1* | 5/2017 | Ohashi ................. | B60W 30/16 |
| 2017/0291603 A1* | 10/2017 | Nakamura .......... | B60W 30/095 |
| 2018/0326906 A1* | 11/2018 | Savaresi ................ | B62J 45/414 |

FOREIGN PATENT DOCUMENTS

| | | |
|---|---|---|
| WO | 2017069740 | 4/2017 |
| WO | 2017115371 | 7/2017 |

OTHER PUBLICATIONS

Savino, G. et al., "Decision logic of an active braking system for powered two wheelers," Proceedings of the Institution of Mechanical Engineers, Part D: Journal of Automobile Engineering, Feb. 16, 2012, pp. 1026-1036.

* cited by examiner

CONTROL SYSTEM AND CONTROL METHOD FOR CONTROLLING BEHAVIOR OF MOTORCYCLE

BACKGROUND OF THE INVENTION

This disclosure relates to a control system and a control method capable of appropriately supporting operation of a motorcycle by a rider.

As a technique relating to a motorcycle (automobile bicycle or automobile tricycle) in the related art, there is a technique for supporting driving by a rider. For example, JP-A-2009-116882 discloses a driver support system that warns the rider that the motorcycle inappropriately approaches an obstacle, based on an output of a forward environment detecting device for detecting the obstacle in a traveling direction or substantially in the traveling direction.

SUMMARY OF THE INVENTION

Incidentally, in order to support driving by a rider, it is conceivable to cause the motorcycle to execute an automatic decelerating operation while the motorcycle is inappropriately approaching the obstacle. Here, regarding the automatic decelerating operation at the time of approaching the obstacle executed by a wide vehicle (for example, passenger car, truck or the like having four wheels), the automatic decelerating operation is already widely used, and various techniques are already established. However, compared to the wide vehicle, the motorcycle has a narrower vehicle width, and a degree of freedom of a traveling position in a width direction of the lane is large. Therefore, in the motorcycle, it is required to take into consideration traveling that is not supposed for the wide vehicle. As the traveling that is not supposed for the wide vehicle, for example, traveling on or in a vicinity of a lane boundary of two lanes adjacent to each other (so-called lane splitting) can be mentioned. That is, in order to appropriately support the driving of the motorcycle by the rider by the automatic decelerating operation, it is required to establish the technology from the viewpoint different from the automatic decelerating operation executed in the wide vehicle.

The present invention has been made in view of the above-described problem, and provides a control system and a control method capable of appropriately supporting driving of a motorcycle by a rider.

According to the present invention, there is provided a control system which controls behavior of a motorcycle, including an obstacle position information acquiring unit that acquires obstacle position information serving as position information of an obstacle existing ahead of the motorcycle, a determination unit that determines whether or not the obstacle is located in a predetermined range where a collision avoiding operation of the motorcycle is required, based on the obstacle position information acquired by the obstacle position information acquiring unit, an execution unit that causes the motorcycle to execute an automatic decelerating operation in a case where it is determined by the determination unit that the obstacle is located in the predetermined range, a lane position information acquiring unit that acquires lane position information serving as relative position information of a lane boundary with respect to the motorcycle during traveling, and a detection angle range setting unit that set a detection angle range of the forward environment detecting device for acquiring the obstacle position information, in which the detection angle range setting unit sets the detection angle range in a vehicle width direction of the motorcycle to be wide in a case where a determination reference is satisfied, and the determination reference includes a condition that the lane position information acquired by the lane position information acquiring unit satisfies a prescribed condition.

According to the present invention, there is provided a control method for controlling behavior of a motorcycle, including an obstacle position information acquiring step of acquiring obstacle position information serving as position information of an obstacle existing ahead of the motorcycle, a determination step of determining whether or not the obstacle is located in a predetermined range where a collision avoiding operation of the motorcycle is required, based on the obstacle position information acquired in the obstacle position information acquiring step, an execution step of causing the motorcycle to execute an automatic decelerating operation, in a case where it is determined that the obstacle is located in the predetermined range in the determination step, a lane position information acquiring step of acquiring a lane position information serving as relative position information of a lane boundary with respect to the motorcycle during traveling, and a detection angle range setting step of setting a detection angle range of a forward environment detecting device for acquiring the obstacle position information, in which in the detection angle range setting step, the detection angle range in a vehicle width direction of the motorcycle is set to be wide in a case where a determination reference is satisfied, and the determination reference includes a condition that the lane position information acquired in the lane position information acquiring step satisfies a prescribed condition.

In the control system and the control method according to the present invention, in order to appropriately execute the automatic decelerating operation at the time of approaching the obstacle in the motorcycle, the relative position information of the lane boundary with respect to the motorcycle is acquired and the detection angle range of the forward environment detecting device for acquiring the obstacle position information is set based on the position information. That is, in a case where the traveling position of the motorcycle in the width direction of the lane is a position where the possibility of approaching the obstacle is increased, it is possible to widen the detection angle range of the forward environment detecting device. Therefore, it is possible to realize an appropriate collision avoiding operation specialized in the motorcycle having a characteristic that a degree of freedom of the traveling position is large in the width direction of the lane.

DETAILED DESCRIPTION

Figure 1:
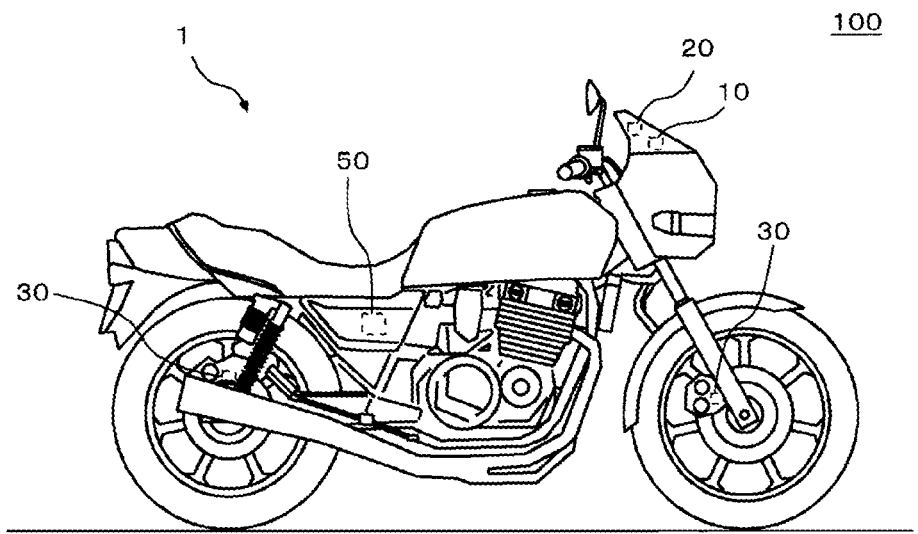
FIG. 1 is a diagram illustrating a mounting state in a motorcycle of a behavior control system according to Embodiment 1 of the present invention.

Hereinafter, a control system and a control method according to the present invention will be described with reference to the drawings.

A term "motorcycle" means a motor bicycle or a motor tricycle among straddle-type vehicles on which riders straddle. In addition, in the following, a case where the motorcycle is the motor bicycle will be described, and the motorcycle may be the motor tricycle.

In addition, the configurations, processing, and the like described below are merely examples, and the control system and the control method according to the present invention are not limited to the case of such a configuration, processing, and the like. In addition, in the following, the same or similar description is simplified or omitted as appropriate. In addition, in each drawing, identical or similar members or portions are not provided with reference numerals or are given the same reference numerals. In addition, for the detailed structure, illustration is simplified or omitted as appropriate.

Embodiment 1

Hereinafter, a behavior control system according to Embodiment 1 will be described.

<Configuration of Behavior Control System>

The configuration of the behavior control system according to Embodiment 1 will be described.

Figure 2:
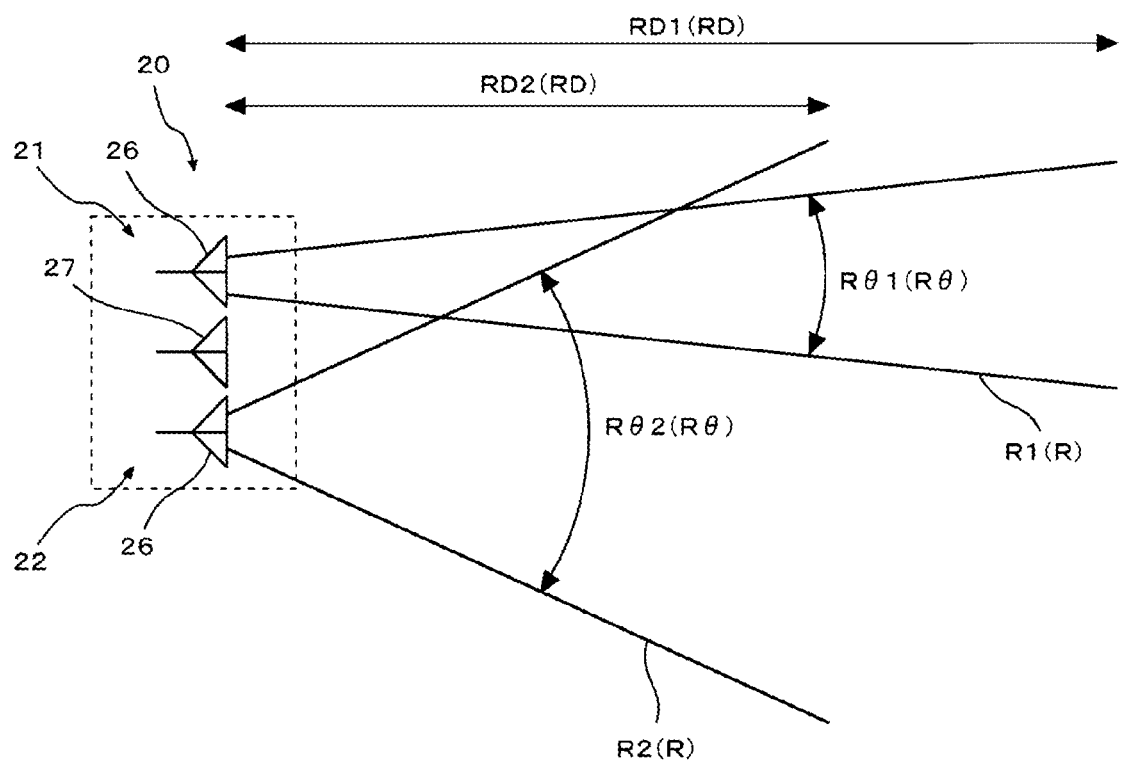
FIG. 2 is a diagram illustrating a configuration of a forward environment detecting device of the behavior control system according to Embodiment 1 of the present invention.
Figure 3:
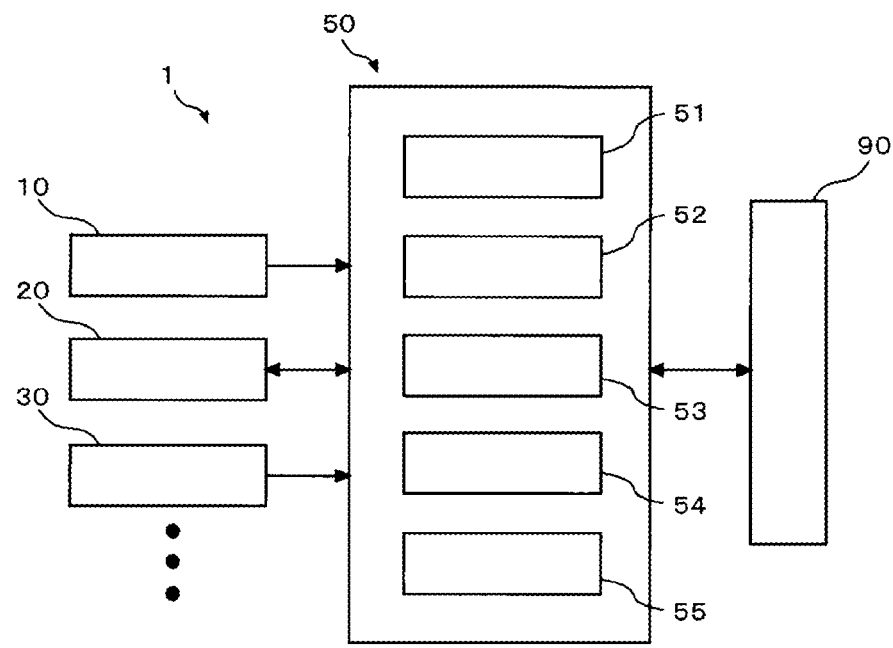
FIG. 3 is a diagram illustrating a system configuration of the behavior control system according to Embodiment 1 of the present invention.
Figure 4:
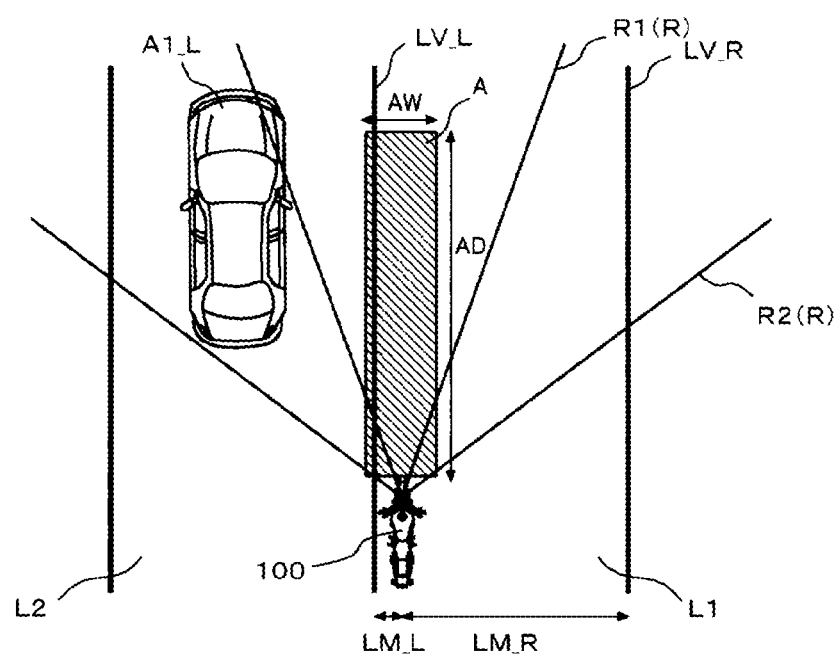
FIG. 4 is a diagram for describing processing of a control system of the behavior control system according to Embodiment 1 of the present invention.

FIG. 1 is a diagram illustrating a mounting state in a motorcycle of a behavior control system according to Embodiment 1 of the present invention. FIG. 2 is a diagram illustrating a configuration of a forward environment detecting device of the behavior control system according to Embodiment 1 of the present invention. FIG. 3 is a diagram illustrating a system configuration of the behavior control system according to Embodiment 1 of the present invention. FIG. 4 is a diagram for describing processing of a control system of the behavior control system according to Embodiment 1 of the present invention.

As illustrated in FIG. 1, the behavior control system 1 is mounted on a motorcycle 100. The behavior control system 1 includes at least an image sensor 10 that captures a traveling road surface of the motorcycle 100, a forward environment detecting device 20 for acquiring position information of an obstacle (for example, a structure, a person, a vehicle, or the like) existing ahead of the motorcycle 100, a speed sensor 30 for recognizing a traveling speed of the motorcycle 100, and a control system (ECU) 50.

The image sensor 10 is attached to a front portion or a side portion of the motorcycle 100 in a state facing the traveling road surface. A detection range of the image sensor 10 is an area capable of capturing lane boundaries LV_R and LV_L on both sides defining a width direction of a traveling lane L1 on which the motorcycle 100 is traveling (refer to FIG. 4). The lane boundaries LV_R and LV_L on both sides may be captured by one image sensor 10 or may be captured by separate image sensors 10.

As illustrated in FIG. 2, the forward environment detecting device 20 includes a first sensing system 21 and a second sensing system 22, having different detection ranges R from each other. That is, the first sensing system 21 is a sensing system having a narrow first detection angle range R$\theta$1 and a long first detection distance range RD1. The second sensing system 22 is a sensing system having a second detection angle range R$\theta$2 wider than the first detection angle range R$\theta$1, and a second detection distance range RD 2 shorter than the first detection distance range RD1.

In the aspect illustrated in FIG. 2, switching the detection angle ranges R$\theta$ of the first sensing system 21 and the second sensing system 22 is realized by making a transmitter 26 different. That is, the first sensing system 21 is configured to include a transmitter 26 having a transmission angle range of R$\theta$1 and a receiver 27. The second sensing system 22 is configured to include a transmitter 26 having a transmission angle range of R$\theta$2 and the receiver 27 shared with the first sensing system 21. Switching the detection angle ranges R$\theta$ between the first sensing system 21 and the second sensing system 22 may be realized by making the receiver 27 different. That is, the first sensing system 21 may be configured to include a transmitter 26 and a receiver 27 having a reception angle range of R$\theta$1. The second sensing system 22 may be configured to include the transmitter 26 shared with the first sensing system 21 and a receiver 27 having a reception angle range of R$\theta$2. Switching the detection angle ranges R$\theta$ between the first sensing system 21 and the second sensing system 22 may be realized by making both the transmitter 26 and the receiver 27 different.

The speed sensor 30 is attached to a moving portion of the motorcycle 100. For example, the speed sensor 30 detects rotational speeds of a front wheel and a rear wheel of the motorcycle 100. The speed sensor 30 may be any sensor as long as the sensor can recognize the traveling speed of the motorcycle 100.

As illustrated in FIG. 3, the control system 50 includes a lane position information acquiring unit 51, a detection angle range setting unit 52, an obstacle position information acquiring unit 53, a determination unit 54, and an execution unit 55. Each of the units of the control system 50 may be provided collectively in one casing or may be divided into a plurality of casings. In addition, a portion or all of the control system 50 may be configured to include, for example, a microcomputer, a microprocessor unit, or the like, or may be configured to include updatable items such as firmware, or may be a program module or the like executed according to a command from a CPU.

Outputs of various sensors (image sensor 10, forward environment detecting device 20, speed sensor 30, and the like) are input to the control system 50. In addition, the control system 50 outputs a signal to the behavior control mechanism 90 (for example, wheel braking mechanism, engine driving mechanism, or the like) to cause the motorcycle 100 to execute an automatic decelerating operation. That is, the control system 50 is a device that is responsible for controlling the behavior control mechanism 90 mounted on the motorcycle 100. The automatic decelerating operation may be executed in a state where there is no operation of the behavior control mechanism 90 by the rider or may be executed in a state where there is the operation of the behavior control mechanism 90 by the rider.

The lane position information acquiring unit 51 acquires the lane position information serving as the relative position information of the lane boundaries with respect to the motorcycle 100 during traveling, based on the output of the image sensor 10.

Specifically, in the situation illustrated in FIG. 4, the lane position information acquiring unit 51 acquires a lane margin LM_L related to the closest lane boundary LV_L from the motorcycle 100, based on the positions of the lane boundaries LV_R and LV_L in the image captured by the image sensor 10. The lane margin LM_L is defined as a distance from the motorcycle 100 to the lane boundary LV_L on the left side in the width direction of the lane L1. In a case where the lane boundary LV_R on the right side is closer to the motorcycle 100 than the lane boundary LV_L on the left side, the lane position information acquiring unit 51 acquires the lane margin LM_R defined as a distance from the motorcycle 100 to the lane boundary LV_R on the right side in the width direction of the lane L1.

The lane margins LM_R and LM_L may be defined as the distances from the image sensor 10 to the lane boundaries LV_R and LV_L, or it may also be defined as the distances from each portion of the motorcycle 100 to the lane boundaries LV_R and LV_L. In addition, the lane margins LM_R and LM_L may be defined as the distances from the motorcycle 100 to the center of the lane boundaries LV_R and LV_L, or it may also be defined as the distances from the motorcycle 100 to the edges of the lane boundaries LV_R and LV_L on the side closer to the motorcycle 100. In addition, the lane boundaries LV_R and LV_L may be defined as lane marks themselves, or it may also be defined as imaginary boundaries connecting two lane marks intermittently disposed side by side in the traveling direction of the motorcycle 100. In addition, the lane position information acquiring unit 51 may acquire other physical quantities that can be substantially converted into the lane margins LM_R and LM_L as the lane margins LM_R and LM_L. For example, the lane position information acquiring unit 51 may acquire other distances that can be substantially converted into the distance from the motorcycle 100 to the lane boundaries LV_R and LV_L in the width direction of the traveling lane L1 as the lane margins LM_R and LM_L, or may acquire the number of pixels of the image sensor 10 as the lane margins LM_R and LM_L.

The detection angle range setting unit 52 determines which of the first sensing system 21 and the second sensing system 22 is to detect the front of the motorcycle 100, based on the lane position information acquired by the lane position information acquiring unit 51, and outputs the command to the forward environment detecting device 20. That is, the detection angle range setting unit 52 sets the detection angle range Rθ of the forward environment detecting device 20 by selecting the first sensing system 21 and the second sensing system 22. Specifically, in a case where the determination reference is not satisfied, the detection angle range setting unit 52 determines to use the first sensing system 21 having a narrow detection angle range Rθ. In a case where the determination reference is satisfied, the detection angle range setting unit 52 determines to use the second sensing system 22 having a wide detected angle range Rθ.

The determination reference includes a condition that the lane position information acquired by the lane position information acquiring unit 51 satisfies a first prescribed condition. Specifically, in a case where the lane position information acquired by the lane position information acquiring unit 51 is information indicating a state where the lane margin LM_L is smaller than the reference value temporarily or over a period longer than the reference period, the detection angle range setting unit 52 sets the detection angle range Rθ of the forward environment detecting device 20 to be wide. The reference value is set to a value larger than the distance at which collision avoiding operation of the motorcycle 100 is difficult with respect to a sudden interruption which may occur in a case where a preceding vehicle A1_L exists on the adjacent lane L2. The reference period is set to a period longer than the standard period required for the motorcycle 100 to change lanes.

The obstacle position information acquiring unit 53 acquires obstacle position information serving as position information of an obstacle located ahead of the motorcycle 100, based on the output of the forward environment detecting device 20 detected at the detection angle range Rθ set by the detection angle range setting unit 52.

The determination unit 54 determines whether or not the obstacle is located in the predetermined range A (refer to FIG. 4) that requires the collision avoiding operation of the motorcycle 100, based on the obstacle position information acquired by the obstacle position information acquiring unit 53 and the output of the speed sensor 30.

As illustrated in FIG. 4, the width AW of the predetermined range A is set to such a width that the motorcycle 100 traveling on or in the vicinity of the lane boundary LV_L can safely pass by a wide vehicle, in a state where the wide vehicle (for example, passenger car, truck or the like having four wheels) is separately disposed in two lanes L1 and L2 extending across the lane boundary LV_L. In addition, a distance AD from the motorcycle 100 to the tip end of the predetermined range A is set to a longer value as the traveling speed of the motorcycle 100 is faster. The predetermined range A may be switched or may not be switched according to the selected sensing system (first sensing system 21, second sensing system 22).

When the determination unit 54 determines that the obstacle is located in the predetermined range A, the execution unit 55 causes the motorcycle 100 to execute the automatic decelerating operation. The automatic decelerating operation may be executed in a state where behavior of the motorcycle 100 is being operated by the rider or may be executed in a state where the behavior of the motorcycle 100 is controlled by an auto cruise function (such as adaptive cruise function). That is, the automatic decelerating operation may be started in a state where the decelerating operation is not being performed, or may be started adjunctively in a situation where the decelerating operation is performed.

<Processing of Behavior Control System>

Processing of the behavior control system according to Embodiment 1 will be described.

Figure 5:
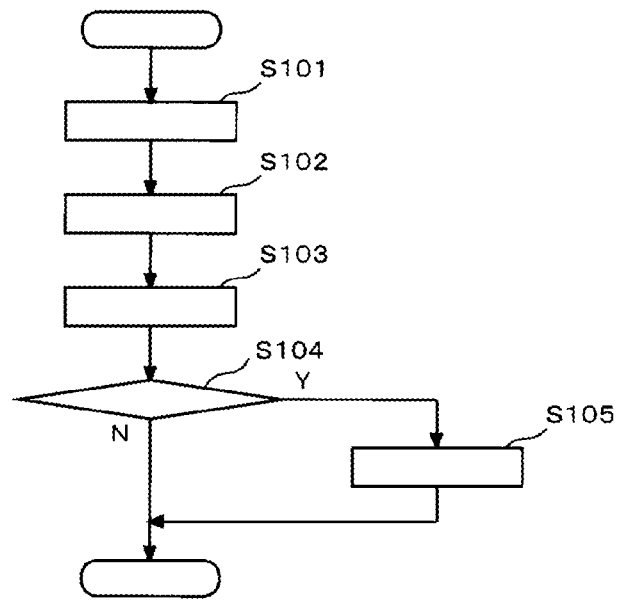
FIG. 5 is a flow chart illustrating a processing flow of the control system of the behavior control system according to Embodiment 1 of the present invention.

FIG. 5 is a flow chart illustrating a processing flow of the control system of the behavior control system according to Embodiment 1 of the present invention.

The control system 50 repeats the processing flow illustrated in FIG. 5 during traveling of the motorcycle 100.

(Lane Position Information Acquiring Step)

In Step S101, the lane position information acquiring unit 51 of the control system 50 acquires the lane position information serving as the relative position information of the lane boundary LV_L closest to the motorcycle 100 with respect to the motorcycle 100 during traveling, based on the output of the image sensor 10.

(Detection Angle Range Setting Step)

In Step S102, the detection angle range setting unit 52 of the control system 50 sets the detection angle range Rθ of the forward environment detecting device 20 by selecting the first sensing system 21 and the second sensing system 22, based on the lane position information acquired by the lane position information acquiring unit 51. Specifically, in a case where the lane position information acquired by the lane position information acquiring unit 51 satisfies the first prescribed condition, the detection angle range setting unit 52 decides to use the second sensing system 22 having the wide detection angle range Rθ.

(Obstacle Position Information Acquiring Step)

In Step S103, the obstacle position information acquiring unit 53 of the control system 50 acquires obstacle position information serving as position information of an obstacle located ahead of the motorcycle 100, based on the outputs of the sensing systems (first sensing system 21, second sensing system 22) selected in Step S102 of the forward environment detecting device 20.

(Determination Step)

In Step S104, the determination unit 54 of the control system 50 determines whether or not the obstacle is located in the predetermined range A where the collision avoiding operation of the motorcycle 100 is required, based on the obstacle position information acquired by the obstacle position information acquiring unit 53 and the output of the speed sensor 30.

(Execution Step)

In Step S104, when it is determined that the obstacle is located in the predetermined range A where the collision avoiding operation of the motorcycle 100 is required, in Step S105, the execution unit 55 of the control system 50 causes the motorcycle 100 to execute the automatic decelerating operation.

<Effect of Behavior Control System>

The effect of the behavior control system according to Embodiment 1 will be described.

The control system 50 includes the lane position information acquiring unit 51 that acquires the lane position information serving as the relative position information of a lane boundary LV_L with respect to the motorcycle 100 during traveling, and the detection angle range setting unit 52 that sets the detection angle range Rθ of the forward environment detecting device 20 for acquiring the obstacle position information, in which the detection angle range setting unit 52 sets the detection angle range Rθ in the vehicle width direction of the motorcycle 100 to be wide in a case where the determination reference is satisfied, and the determination reference includes a condition that the lane position information acquired by the lane position information acquiring unit 51 satisfies the first prescribed condition. That is, in a case where the traveling position of the motorcycle 100 in the width direction of the lane is a position where the possibility of approaching the obstacle is increased, it is possible to widen the detection angle range Rθ of the forward environment detecting device 20. Therefore, it is possible to realize an appropriate collision avoiding operation specialized in the motorcycle 100 having a characteristic that a degree of freedom of the traveling position is large in the width direction of the lane.

Preferably, the first prescribed condition is a condition that the lane position information acquired by the lane position information acquiring unit 51 is information indicating a state where the lane margin LM_L is smaller than the reference value temporarily or over a period longer than the reference period. For example, in the example illustrated in FIG. 4, in a case where the motorcycle 100 travels on or in the vicinity of the lane boundary LV_L, when a sudden interruption of the preceding vehicle A1_L from the lane L2 occurs, the collision avoiding operation may not be completed in time due to the detection delay of the forward environment detecting device 20. On the other hand, in a case where the motorcycle 100 travels on or in the vicinity of the lane boundary LV_L and the detection angle range Rθ of the forward environment detecting device 20 is set to be wide, the control system 50 recognizes the sudden interruption of the preceding vehicle A1_L as early as possible and issues a warning prompting the rider the collision avoiding operation. Accordingly, it is possible to accelerate the start of the automatic decelerating operation and the safety of the rider is improved.

Embodiment 2

Hereinafter, a behavior control system according to Embodiment 2 will be described. The description overlapping or similar to the behavior control system according to Embodiment 1 is simplified or omitted as appropriate.

<Configuration of Behavior Control System>

The configuration of the behavior control system according to Embodiment 2 will be described.

Figure 6:
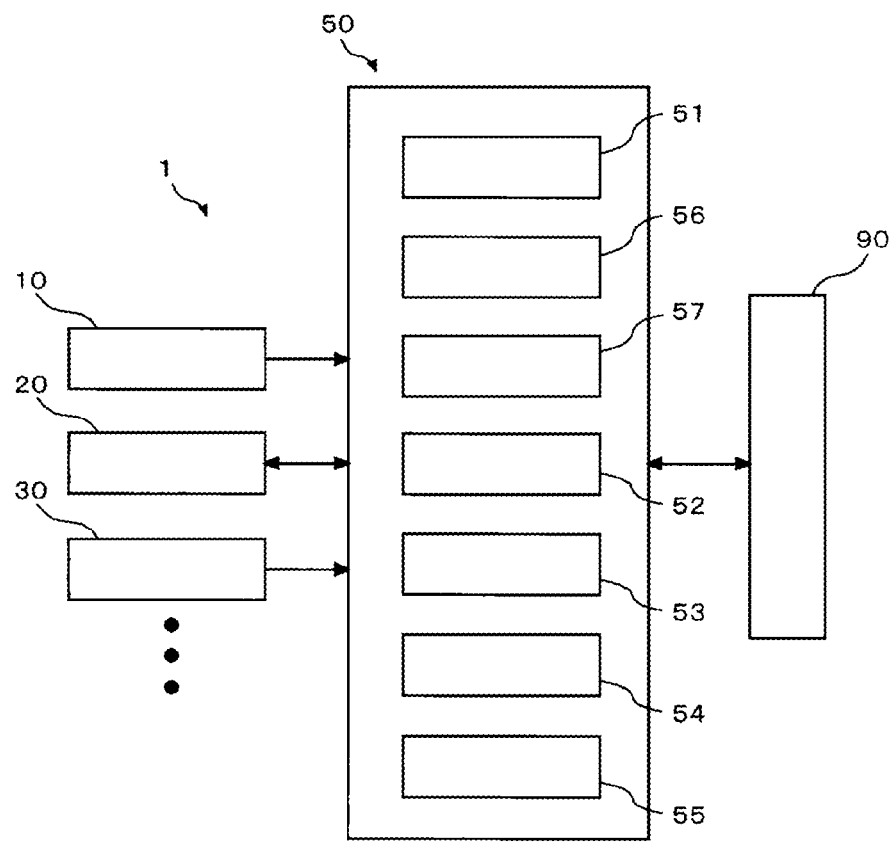
FIG. 6 is a diagram illustrating a system configuration of a behavior control system according to Embodiment 2 of the present invention.
Figure 7:
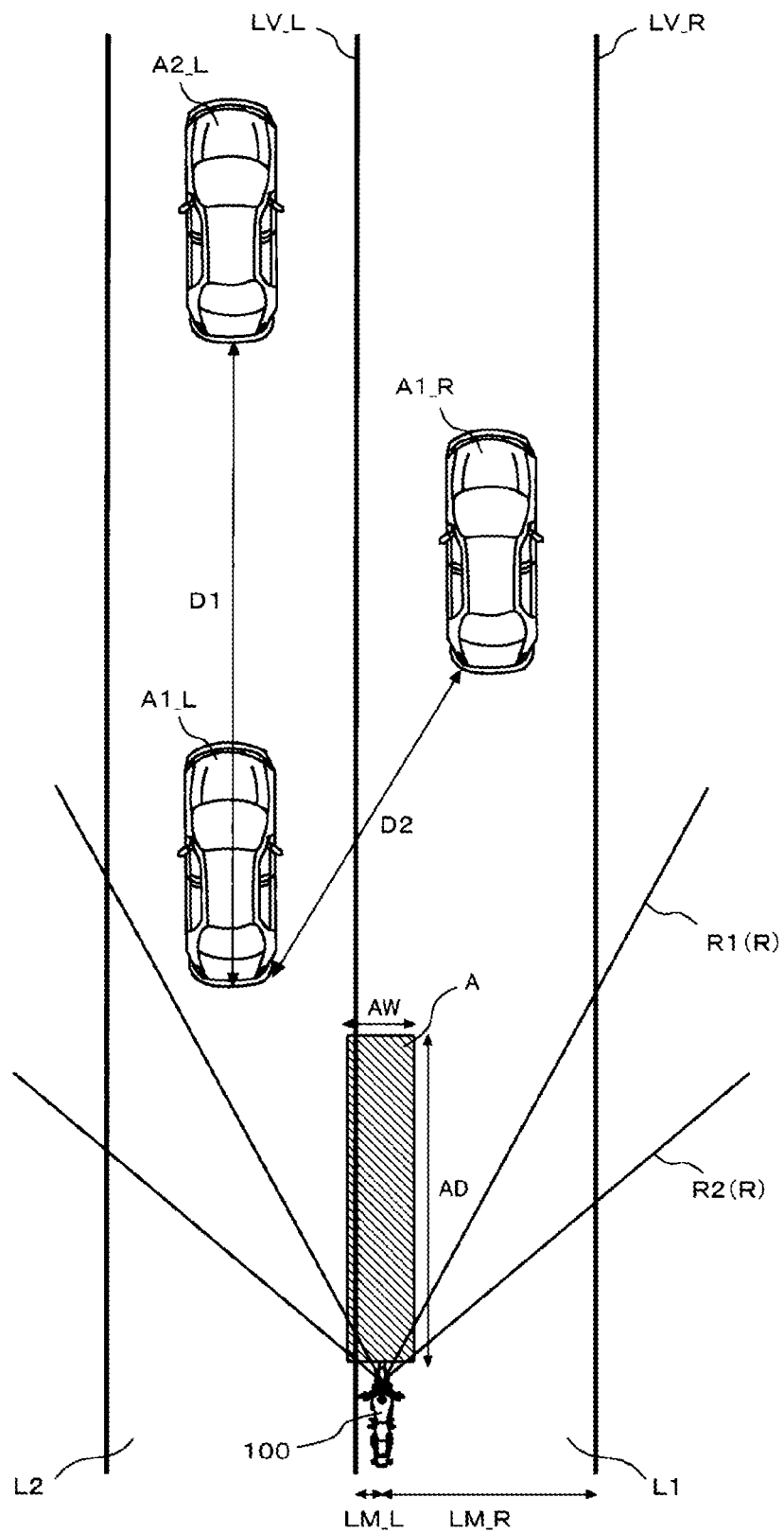
FIG. 7 is a diagram for describing processing of a control system of the behavior control system according to Embodiment 2 of the present invention.

FIG. 6 is a diagram illustrating a system configuration of a behavior control system according to Embodiment 2 of the present invention. FIG. 7 is a diagram for describing processing of a control system of the behavior control system according to Embodiment 2 of the present invention.

As illustrated in FIG. 6, the control system 50 includes the lane position information acquiring unit 51, a forward traffic information acquiring unit 56, a traveling speed information acquiring unit 57, the detection angle range setting unit 52, the obstacle position information acquiring unit 53, the determination unit 54, and the execution unit 55.

The forward traffic information acquiring unit 56 acquires forward traffic information serving as traffic information ahead of the motorcycle 100 (in particular, degree of congestion in the lanes L1 and L2), based on the output of the forward environment detecting device 20. Specifically, in the example illustrated in FIG. 7, the forward traffic information acquiring unit 56 acquires an interval D1 between the two preceding vehicles A1_L and A2_L traveling in the lane L2 in which the preceding vehicle travels in cascade, among the two lanes L1 and L2 extending across the lane boundary LV_L closest to the motorcycle 100, as forward traffic information. In addition, in the example illustrated in FIG. 7, the forward traffic information acquiring unit 56 acquires an interval D2 between the two preceding vehicles A1_R and A1_L that are divided and located on the two lanes L1 and L2 extending across the lane boundary LV_L closest to the motorcycle 100, as forward traffic information.

The interval D1 may be defined as the distance from the rear end of the preceding vehicle A1_L on the forward side to the rear end of the preceding vehicle A2_L on the rearward side, or may also be defined as a distance from other portion of the preceding vehicle A1_L to other portion of the preceding vehicle A2_L. In addition, the forward traffic information acquiring unit 56 may acquire other physical quantity that can be substantially converted into the interval D1 as forward traffic information. For example, the forward traffic information acquiring unit 56 may acquire other distance that can be substantially converted into the interval D1 as forward traffic information.

In addition, the interval D2 may be defined as a distance from a position closest to the motorcycle 100 of the preceding vehicle A1_R traveling on the lane L1 on the right side of the lane boundary LV_L to a position closest to the motorcycle 100 of the preceding vehicle A1_L traveling on the lane L2 on the left side of the lane boundary LV_L, or may be defined as a distance from other portion of the preceding vehicle A1_R to other portion of the preceding vehicle A1_L. In addition, the forward traffic information acquiring unit 56 may acquire other physical quantity that can be substantially converted into the interval D2 as forward traffic information. For example, the forward traffic information acquiring unit 56 may acquire other distance that can be substantially converted into the interval D2 as forward traffic information.

In addition, in the example illustrated in FIG. 7, the forward traffic information acquiring unit 56 may acquire the absolute speeds of the plurality of preceding vehicles A1_R, A1_L, and A2_L traveling on the lanes L1 and L2 as forward traffic information. For example, the forward traffic information acquiring unit 56 may acquire other physical quantity that can be substantially converted into the absolute speed as forward traffic information. In addition, the forward traffic information acquiring unit 56 may acquire the average value of the absolute speeds of the plurality of preceding vehicles A1_R, A1_L, and A2_L as forward traffic information, or may acquire each absolute speed as forward traffic information. Even with such a configuration, it is possible to estimate the degree of congestion in the lanes L1 and L2.

In addition, in the example illustrated in FIG. 7, the forward traffic information acquiring unit 56 may acquire relative speeds of the plurality of preceding vehicles A1_R, A1_L, and A2_L traveling in the lanes L1 and L2 with respect to the motorcycle 100 as forward traffic information. For example, the forward traffic information acquiring unit 56 may acquire other physical quantity that can be substantially converted into the relative speed as forward traffic information. In addition, the forward traffic information acquiring unit 56 may acquire the average value of the relative speeds of the plurality of preceding vehicles A1_R, A1_L, and A2_L as forward traffic information, or may acquire each relative speed as forward traffic information. Even with such a configuration, it is possible to estimate the degree of congestion in the lanes L1 and L2.

The traveling speed information acquiring unit 57 acquires traveling speed information of the motorcycle 100 during traveling, based on the output of the speed sensor 30. The traveling speed information acquired by the traveling speed information acquiring unit 57 may be diverted to the setting of the distance AD from the motorcycle 100 to the tip end of the predetermined range A in the determination unit 54.

In a case where the determination reference is not satisfied, the detection angle range setting unit 52 determines to use the first sensing system 21 having a narrow detection angle range R. In a case where the determination reference is satisfied, the detection angle range setting unit 52 determines to use the second sensing system 22 having a wide detected angle range R. The determination reference includes a condition that the lane position information acquired by the lane position information acquiring unit 51 satisfies the first prescribed condition, a condition that the forward traffic information acquired by the forward traffic information acquiring unit 56 satisfies a second prescribed condition, and a condition that the traveling speed information acquired by the traveling speed information acquiring unit 57 satisfies a third prescribed condition.

Specifically, the first prescribed condition is a condition that the lane position information acquired by the lane position information acquiring unit 51 is information indicating a state where the lane margin LM_L is smaller than the reference value temporarily or over a period longer than the reference period.

In addition, the second prescribed condition is at least one of the condition that the forward traffic information acquired by the forward traffic information acquiring unit 56 is information indicating a state where the interval D1 between the two preceding vehicles A1_L and A2_L located on the lane L2 in which the preceding vehicle travels in cascade among the two lanes L1 and L2 is narrower than the reference interval, and the condition that the interval D2 between the two preceding vehicles A1_R and A1_L that are divided and located on the two lanes L1 and L2 is narrower than the reference interval. The reference interval for comparison with the interval D1 is set to be an interval wider than the standard interval at which lane change is likely to occur. In addition, the reference interval for comparison with the interval D2 is set to be an interval wider than the interval at which passing-through by the motorcycle 100 is difficult.

In addition, the second prescribed condition may be at least one of the condition that the forward traffic information acquired by the forward traffic information acquiring unit 56 is the information indicating a state where the absolute speeds of the plurality of preceding vehicles A1_R, A1_L, A2_L located on the two lanes L1 and L2 (average value of absolute speeds or all of each absolute speed) are lower than the reference absolute speed and the condition that the forward traffic information is the information indicating a state where the relative speeds of the plurality of preceding vehicles A1_R, A1_L, A2_L located on the two lanes L1 and L2 with respect to the motorcycle 100 (average value of relative speeds or all of each relative speed) are lower than the reference relative speed. The reference absolute speed for comparison with the absolute speed and the reference relative speed for comparison with the relative speed are set taking into consideration the standard speed at the time of non-congestion. The determination using the intervals D1 and D2 and the determination using the speed (absolute speed, relative speed) may be combined.

In addition, the third prescribed condition is a condition that the traveling speed information acquired by the traveling speed information acquiring unit 57 is information indicating a state where the motorcycle 100 travels at a speed lower than the reference speed. The reference speed is set to a speed at which the motorcycle 100 can safely avoid the obstacle by the automatic decelerating operation.

<Processing of Behavior Control System>

Processing of the behavior control system according to Embodiment 2 will be described.

Figure 8:
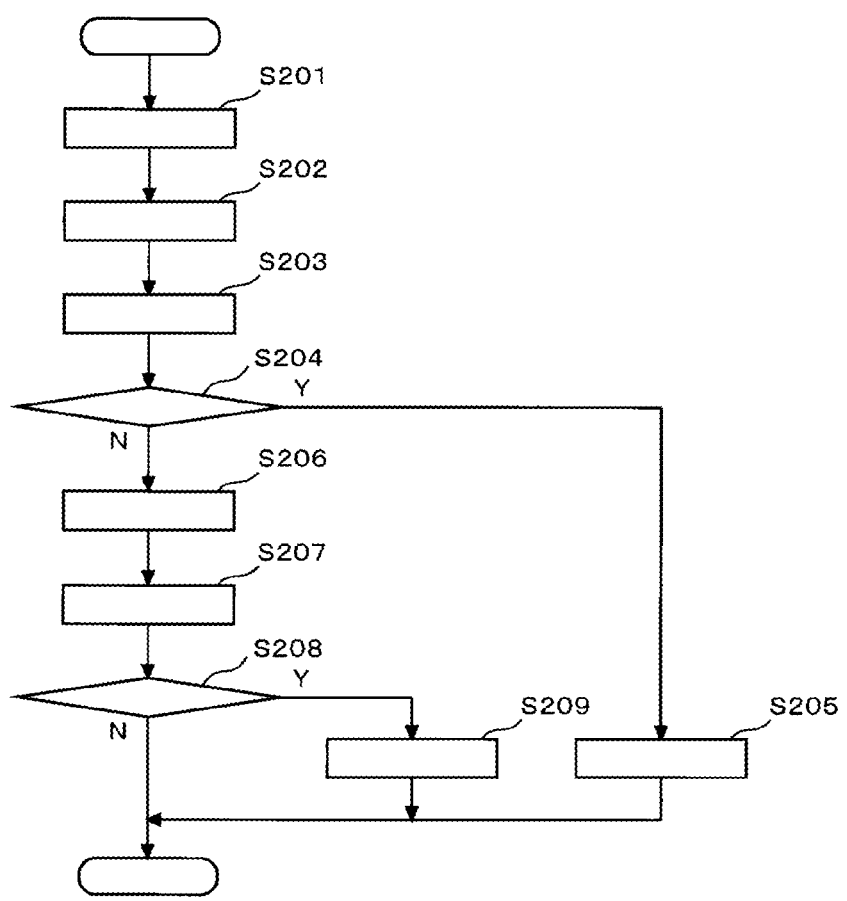
FIG. 8 is a flow chart illustrating a processing flow of the control system of the behavior control system according to Embodiment 2 of the present invention.

FIG. 8 is a flow chart illustrating a processing flow of the control system of the behavior control system according to Embodiment 2 of the present invention.

The control system 50 repeats the processing flow illustrated in FIG. 8 during the traveling of the motorcycle 100. Steps S207 to S209 of the processing flow illustrated in FIG. 8 are the same as Steps S103 to S105 of the processing flow illustrated in FIG. 5, so that the description will be omitted.

(Lane Position Information Acquiring Step)

In Step S201, the lane position information acquiring unit 51 of the control system 50 acquires the lane position information serving as the relative position information of the lane boundary LV_L closest to the motorcycle 100 with respect to the motorcycle 100 during traveling, based on the output of the image sensor 10.

(Forward Traffic Information Acquiring Step)

In Step S202, the forward traffic information acquiring unit 56 of the control system 50 acquires forward traffic information serving as traffic information ahead of the motorcycle 100 during traveling, based on the output of the forward environment detecting device 20.

(Traveling Speed Information Acquiring Step)

In Step S203, the traveling speed information acquiring unit 57 of the control system 50 acquires traveling speed information of the motorcycle 100 during traveling, based on the output of the speed sensor 30.

(Prohibition Step-1)

In Step S204, in a case where the lane position information acquired by the lane position information acquiring unit 51 satisfies the first prescribed condition, the forward traffic information acquired by the forward traffic information acquiring unit 56 satisfies the second prescribed condition, and the traveling speed information acquired by the traveling speed information acquiring unit 57 does not satisfy the third prescribed condition, the execution unit 55 of the control system 50 proceeds to Step S205. In addition, otherwise, the execution unit 55 of the control system 50 proceeds to Step S206.

(Prohibition Step-2)

In Step S205, the execution unit 55 of the control system 50 prohibits the motorcycle 100 from executing the automatic decelerating operation.

(Detection Angle Range Setting Step))

In Step S206, the detection angle range setting unit 52 of the control system 50 sets the detection angle range Rθ of the forward environment detecting device 20 by selecting the first sensing system 21 and the second sensing system 22, based on the lane position information acquired by the lane position information acquiring unit 51, the forward traffic information acquired by the forward traffic information acquiring unit 56, and the traveling speed information acquired by the traveling speed information acquiring unit 57. Specifically, in a case where the lane position information acquired by the lane position information acquiring unit 51 satisfies the first prescribed condition, the forward traffic information acquired by the forward traffic information acquiring unit 56 satisfies the second prescribed condition, and the traveling speed information acquired by the traveling speed information acquiring unit 57 satisfies the third prescribed condition, the detection angle range setting unit 52 decides to use the second sensing system 22 having the wide detection angle range Rθ.

<Effect of Behavior Control System>

The effect of the behavior control system according to Embodiment 2 will be described.

Preferably, the control system 50 is provided with the forward traffic information acquiring unit 56 that acquires forward traffic information on at least one lane of the two lanes L1 and L2 extending across the lane boundary LV_L, in addition to the lane position information acquiring unit 51, and the determination reference for determining whether or not to extend the detected angle range Rθ includes a condition that the forward traffic information acquired by the forward traffic information acquiring unit 56 satisfies the second prescribed condition.

For example, as in the example illustrated in FIG. 7, in a situation where the preceding vehicles A1_R, A1_L, and A2_L travel densely, there is a high possibility that the preceding vehicles A1_R, A1_L, and A2_L change lanes. Accordingly, the necessity of quickly recognizing the sudden interruptions of the preceding vehicles A1_R, A1_L, and A2_L increases by setting the detected angle range Rθ of the forward environment detecting device 20 to be wide. In addition, when the motorcycle 100 passes through between the preceding vehicles A1_R, A1_L and A2_L, the traveling route is narrow, and the necessity of quickly recognizing the wandering of the preceding vehicles A1_R, A1_L, and A2_L increases by setting the detection angle range Rθ of the forward environment detecting device 20 to be wide. In a case where both the first prescribed condition and the second prescribed condition are satisfied, the detection angle range setting unit 52 sets the detection angle range Rθ to be wide, so that the safety of the rider in such a situation is improved.

In particular, in a case where at least one of the first prescribed condition and the second prescribed condition is not satisfied, the detection angle range setting unit 52 may not set the detection angle range Rθ to be wide. With such a configuration, for example, in a situation where the preceding vehicles are not crowded, in a situation where the motorcycle 100 is not traveling on or in the vicinity of the lane boundary LV_L, or the like, the detection angle range Rθ is unnecessarily set to be wide and delay in detection of a distant obstacle is inhibited.

In addition, the second prescribed condition may be a condition that the forward traffic information acquired by the forward traffic information acquiring unit 56 is information indicating a state where the interval D1 between the two preceding vehicles A1_L and A2_L located on one lane L2 of the two lanes L1 and L2 is narrower than the reference interval. With such a configuration, it is possible to accurately cope with a situation where lane change is likely to occur.

In addition, the second prescribed condition may be a condition that the forward traffic information acquired by the forward traffic information acquiring unit 56 is information indicating a state where the interval D2 between the two preceding vehicles A1_R and A1_L that are divided and located on the two lanes L1 and L2 is narrower than the reference interval. With such a configuration, it is possible to accurately cope with a situation where the traveling route narrows.

In addition, the second prescribed condition may be a condition that the forward traffic information acquired by the forward traffic information acquiring unit 56 is information indicating a state where the absolute speeds of the plurality of preceding vehicles A1_R, A1_L, and A2_L located on the two lanes L1 and L2 are lower than the reference absolute speed. With such a configuration, it is possible to accurately cope with a situation where lane change is likely to occur.

In addition, the second prescribed condition may be a condition that the forward traffic information acquired by the forward traffic information acquiring unit 56 is information indicating a state where the relative speeds of the plurality of preceding vehicles A1_R, A1_L, and A2_L located on the two lanes L1 and L2 with respect to the motorcycle 100 are lower than the reference relative speed. With such a configuration, it is possible to accurately cope with a situation where the necessity of quickly recognizing the sudden interruption, wandering, and the like as soon as possible increases.

Preferably, the control system 50 is provided with the traveling speed information acquiring unit 57, in addition to the lane position information acquiring unit 51 and the forward traffic information acquiring unit 56, and the determination reference for determining whether or not to extend the detected angle range Rθ includes a condition that the traveling speed information acquired by the traveling speed information acquiring unit 57 satisfies the third prescribed condition.

For example, as in the example illustrated in FIG. 7, in a situation where the preceding vehicles A1_R, A1_L, and A2_L travel densely and in a case where the traveling speed of the motorcycle 100 is fast, it may be difficult to avoid collision by the automatic decelerating operation. Under such a situation, collision avoidance by the operation by the rider is required to be given priority. In addition, it is also desirable to recognize new obstacles appearing as early as possible after the collision is avoided by the operation by the rider. In a case where all of the first prescribed condition, the second prescribed condition, and the third prescribed condition are satisfied, the detection angle range setting unit 52 sets the detection angle range Rθ to be wide. Accordingly, the detection angle range Rθ is unnecessarily set to be wide so that the detection of such an obstacle is inhibited from being delayed.

In particular, in a case where both the first prescribed condition and the second prescribed condition are satisfied and the third prescribed condition is not satisfied, the execution unit 55 may prohibit the automatic decelerating operation. With such a configuration, execution of the automatic decelerating operation under circumstances where collision avoidance by the operation by the rider is required to be given priority, and influence on the operation by the rider are inhibited.

In addition, the third prescribed condition may be a condition that the traveling speed information acquired by the traveling speed information acquiring unit 57 is information indicating a state where the motorcycle 100 travels at a speed lower than the reference speed. With such a configuration, it is possible to accurately cope with a situation where it is difficult to avoid collision by the automatic decelerating operation.

Hereinbefore, although Embodiment 1 and Embodiment 2 have been described, the present invention is not limited to the description of each embodiment. For example, all or a portion of each embodiment may be implemented. In addition, the order of each of the steps in the control system 50 may be exchanged.

That is, in Embodiment 1 and Embodiment 2, although the case where the image sensor 10 captures both of the lane boundary LV_R and the lane boundary LV_L is described, the image sensor 10 may capture only one of the lane boundary LV_R and the lane boundary LV_L as long as the control system 50 can acquire the width of the lane L1 on which the motorcycle 100 travels from other information source (for example, map information or the like).

In addition, in Embodiment 2, although the case where the forward traffic information is acquired based on the output of the forward environment detecting device 20 is described, the forward traffic information may be acquired, based on other information sources (for example, traffic jam information or the like supplied to navigation system).

REFERENCE SIGNS LIST

1: Behavior control system
10: Image sensor
20: Forward environment detecting device
21: First sensing system
22: Second sensing system
26: Transmitter
27: Receiver
30: Speed sensor
50: Control system
51: Lane position information acquiring unit
52: Detection angle range setting unit
53: Obstacle position information acquiring unit
54: Determination unit
55: Execution unit
56: Forward traffic information acquiring unit
57: Traveling speed information acquiring unit
90: Behavior control mechanism
100: Motorcycle
A1_R, A1_L, A2_L: Preceding vehicle
R, R1, R2: Detection range
Rθ, Rθ1, Rθ2: Detection angle range
RD, RD 1, RD 2: Detection distance range
L1, L2: Lane
LV_R, LV_L: Lane boundary
LM_R, LM_L: Lane margin
D1, D2: Interval

The invention claimed is:

1. A control system (50) which controls behavior of a motorcycle (100), the system comprising:
   an obstacle position information acquiring unit (53) that acquires obstacle position information serving as position information of an obstacle existing ahead of the motorcycle (100);
   a determination unit (54) that determines whether the obstacle is located in a predetermined range (A) where a collision avoiding operation of the motorcycle (100) is required, based on the obstacle position information acquired by the obstacle position information acquiring unit (53);
   an execution unit (55) that causes the motorcycle (100) to execute an automatic decelerating operation in a case where it is determined by the determination unit (54) that the obstacle is located in the predetermined range (A);
   a lane position information acquiring unit (51) that acquires lane position information serving as relative position information of lane boundaries (LV_R, LV_L) with respect to the motorcycle (100) during traveling; and
   a detection angle range setting unit (52) that sets a detection angle range (Rθ) of a forward environment detecting device (20) for acquiring the obstacle position information,
   wherein the detection angle range setting unit (52) sets the detection angle range (Rθ) in a vehicle width direction of the motorcycle (100) to be wide in a case where a determination reference is satisfied, and
   wherein the determination reference includes a condition that the lane position information acquired by the lane position information acquiring unit (51) satisfies a prescribed condition.

2. The control system according to claim 1,
   wherein the prescribed condition is a condition that the lane position information acquired by the lane position information acquiring unit (51) is information indicating a state where a distance from the lane boundary (LV_L) closest to the motorcycle (100) to the motorcycle (100) is smaller than a reference value temporarily or over a period longer than a reference period.

3. The control system according to claim 1, further comprising:
   a forward traffic information acquiring unit (56) that acquires forward traffic information on at least one lane of two lanes (L1, L2) extending across the lane boundary (LV_L),
   wherein the prescribed condition is a first prescribed condition, and
   wherein the determination reference includes a condition that the forward traffic information acquired by the forward traffic information acquiring unit (56) satisfies a second prescribed condition.

4. The control system according to claim 3,
   wherein the second prescribed condition includes a condition that the forward traffic information acquired by the forward traffic information acquiring unit (56) is information indicating a state where an interval (D1) between the two preceding vehicles (A1_L, A2_L)

located on one lane (L2) of the two lanes (L1, L2) is narrower than a reference interval.

5. The control system according to claim 3,
wherein the second prescribed condition includes a condition that the forward traffic information acquired by the forward traffic information acquiring unit (56) is information indicating a state where an interval (D2) between the two preceding vehicles (A1_R, A1_L) divided and located on the two lanes (L1, L2) is narrower than a reference interval.

6. The control system according to claim 3,
wherein the second prescribed condition includes a condition that the forward traffic information acquired by the forward traffic information acquiring unit (56) is information indicating a state where absolute speeds of a plurality of preceding vehicles (A1_R, A1_L, A2_L) located on the two lanes (L1, L2) are lower than a reference absolute speed.

7. The control system according to claim 3,
wherein the second prescribed condition includes a condition that the forward traffic information acquired by the forward traffic information acquiring unit (56) is information indicating a state where relative speeds of the plurality of preceding vehicles (A1_R, A1_L, A2_L) located on the two lanes (L1, L2) with respect to the motorcycle (100) are lower than a reference relative speed.

8. The control system according to claim 3, further comprising:
a traveling speed information acquiring unit (57) that acquires traveling speed information of the motorcycle (100),
wherein the determination reference includes a condition that the traveling speed information acquired by the traveling speed information acquiring unit (57) satisfies a third prescribed condition.

9. The control system according to claim 8,
wherein the third prescribed condition is a condition that the traveling speed information acquired by the traveling speed information acquiring unit (57) is information indicating a state where the motorcycle (100) travels at a speed lower than the reference speed.

10. The control system according to claim 8,
wherein the execution unit (55) prohibits the automatic decelerating operation in a case where both of the first prescribed condition and the second prescribed condition are satisfied, and the third prescribed condition is not satisfied.

11. The control system according to claim 1,
wherein the lane position information is acquired, based on an output of an image sensor (10).

12. A control method for controlling behavior of a motorcycle (100), the method comprising:
an obstacle position information acquiring step (S103, S207) of acquiring obstacle position information serving as position information of an obstacle existing ahead of the motorcycle (100);
a determination step (S104, S208) of determining whether or not the obstacle is located in a predetermined range (A) where a collision avoiding operation of the motorcycle (100) is required, based on the obstacle position information acquired in the obstacle position information acquiring step (S103, S207);
an execution step (S105, S209) of causing the motorcycle (100) to execute an automatic decelerating operation, in a case where it is determined that the obstacle is located in the predetermined range (A) in the determination step (S104, S208); and
a lane position information acquiring step (S101, S201) of acquiring a lane position information serving as relative position information of a lane boundary (LV_R, LV_L) with respect to the motorcycle (100) during traveling; and
a detection angle range setting step (S102, S206) of setting a detection angle range (Rθ) of a forward environment detecting device (20) for acquiring the obstacle position information,
wherein, in the detection angle range setting step (S102, S206), the detection angle range (Rθ) in a vehicle width direction of the motorcycle (100) is set to be wide in a case where a determination reference is satisfied, and
wherein the determination reference includes a condition that the lane position information acquired in the lane position information acquiring step (S101, S201) satisfies a prescribed condition.

* * * * *